(12) United States Patent
Huang et al.

(10) Patent No.: US 12,020,490 B2
(45) Date of Patent: Jun. 25, 2024

(54) METHOD AND DEVICE FOR ESTIMATING POSITION OF NETWORKED VEHICLE BASED ON INDEPENDENT NON-UNIFORM INCREMENT SAMPLING

(71) Applicant: ZHEJIANG LAB, Zhejiang (CN)

(72) Inventors: Qian Huang, Hangzhou (CN); Yongdong Zhu, Hangzhou (CN); Zhifeng Zhao, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/493,795

(22) Filed: Oct. 24, 2023

(65) Prior Publication Data
US 2024/0071099 A1 Feb. 29, 2024

Related U.S. Application Data

(63) Continuation of application No. PCT/CN2022/131000, filed on Nov. 10, 2022.

(30) Foreign Application Priority Data

Jul. 20, 2022 (CN) .......................... 202210854127.4

(51) Int. Cl.
*G06T 7/70* (2017.01)
*G06V 20/58* (2022.01)

(52) U.S. Cl.
CPC .................................. *G06V 20/58* (2022.01)

(58) Field of Classification Search
CPC ... G08G 1/00; G08G 1/16; G06T 7/20; G06T 7/00; G06T 17/05; G06T 7/11;
(Continued)

(56) References Cited

U.S. PATENT DOCUMENTS 11,099,275 B1 8/2021 Zhang et al.
2019/0102674 A1* 4/2019 Kwant .................. G06F 16/215
(Continued)

FOREIGN PATENT DOCUMENTS

CN 107610084 A 1/2018
CN 111583663 A 8/2020
(Continued)

OTHER PUBLICATIONS

International Search Report (PCT/CN2022/131000); Date of Mailing: Mar. 21, 2023.
(Continued)

*Primary Examiner* — Quan M Hua
(74) *Attorney, Agent, or Firm* — W&G Law Group

(57) ABSTRACT

The present application discloses a method and a device for estimating the position of a networked vehicle based on independent non-uniform increment sampling. By mapping a laser radar point cloud to a spatiotemporal aligned image, independent non-uniform increment sampling is carried out on the mapping points falling in an advanced semantic constraint region of the image according to a point density of the depth interval where the mapping points are located, and the virtual mapping points generated by sampling are reversely mapped to the original point cloud space and merged with the original point cloud, and the combined point cloud is used to estimate the position of the networked vehicle based on a deep learning method, so as to solve the inaccurate position estimation problem of sheltered or remote networked vehicles due to the sparseness or missing of its own point cloud clusters.

8 Claims, 4 Drawing Sheets

(58) Field of Classification Search
CPC . G06T 7/136; G06T 7/55; G06T 11/20; G06T 15/08; G06T 5/00; G06T 7/269; G06T 7/10; G06T 7/50; G06T 7/579; G06T 7/571; G06T 2207/10028; G06V 10/80; G06V 20/58; G06V 10/82; G06V 10/26; G06V 20/56; G06V 10/44; G06V 10/764; G06V 20/64; G06V 10/74; G06V 10/762; G06V 10/25; G06V 10/40; G06V 10/46; G06V 10/766; G06V 10/774; G06V 20/588; G06V 20/20; G06V 20/584; G06F 3/0482; G06F 3/0484; G06F 13/42; H04W 4/40; H04W 4/46

See application file for complete search history.

(56) References Cited

U.S. PATENT DOCUMENTS

| | | | | |
|---|---|---|---|---|
| 2019/0147245 | A1* | 5/2019 | Qi | G06V 10/82 |
| | | | | 382/103 |
| 2020/0394822 | A1* | 12/2020 | Gao | G06T 9/001 |
| 2021/0094577 | A1* | 4/2021 | Shalev-Shwartz | G06T 7/20 |
| 2022/0180543 | A1 | 6/2022 | Ling et al. | |

FOREIGN PATENT DOCUMENTS

| | | |
|---|---|---|
| CN | 111968133 A | 11/2020 |
| CN | 112749616 A | 5/2021 |
| CN | 113870553 A | 12/2021 |
| CN | 114078145 A | 2/2022 |
| CN | 114463286 A | 5/2022 |
| CN | 114724120 A | 7/2022 |
| CN | 114758504 A | 7/2022 |
| CN | 114937081 A | 8/2022 |
| WO | 2008048424 A2 | 4/2008 |
| WO | 2022126427 A1 | 6/2022 |

OTHER PUBLICATIONS

First Office Action(CN202210854127.4); Date of Mailing: Sep. 5, 2022.

Notice Of Allowance(CN202210854127.4); Date of Mailing: Sep. 28, 2022.

* cited by examiner

METHOD AND DEVICE FOR ESTIMATING POSITION OF NETWORKED VEHICLE BASED ON INDEPENDENT NON-UNIFORM INCREMENT SAMPLING

CROSS-REFERENCE TO RELATED APPLICATIONS

The present application is a continuation of International Application No. PCT/CN2022/131000, filed on Nov. 10, 2022, which claims priority to Chinese Application No. 202210854127.4, filed on Jul. 20, 2022, the contents of both of which are incorporated herein by reference in their entireties.

TECHNICAL FIELD

The present application relates to the technical field of intelligent traffic perception and in particular, to a method and a device for estimating the position of a networked vehicle based on independent non-uniform increment sampling.

BACKGROUND

With the wide application of intelligent networked vehicles, it is an important topic to monitor the behavior of a networked vehicle and estimate its position through vehicle-road coordination technology and multi-sensor equipment installed on the roadside in the park, and to perform security management and control on networked vehicle. Low-cost solid-state laser radar is commonly used to sense the position of the networked vehicle. However, due to the short sensing distance of solid-state laser radar and the mutual occlusion of targets within the sensing range, the point cloud clusters of the networked vehicle, that are far away from the scanning origin point or partially occluded are prone to be sparse or missing. At the same time, the existing perception algorithm based on neural network completes the regression and classification of three-dimensional targets through feature extraction of point cloud data to realize the position estimation of the networked vehicle. Although the trained neural network model has a certain degree of generalization ability for targets with sparse or missing point clouds and can identify low-density point cloud targets or point cloud targets with a small part of missing, the targets with serious occlusion or less point clouds, especially those far away from the radar field of vision, are limited by the lack of the outline shape of their point cloud clusters, and it is almost impossible to use the neural network method to perceive them. Therefore, the present disclosure combined with advanced semantic feature from spatiotemporal synchronous image data frames, an independent non-uniform increment sampling method is adopted to sample point cloud mapping points incrementally, and the generated virtual mapping points are used to fill and enhance the original point cloud clusters of the networked vehicle, so as to solve the inaccurate position estimation problem of sheltered or remote networked vehicles due to the sparseness or missing of its own point cloud clusters.

SUMMARY

The object of the present application is to provide a method and a device for estimating the position of a networked vehicle based on independent non-uniform increment sampling. By mapping the original point cloud data of a laser radar to a spatiotemporal aligned image, an independent and non-uniform increment sampling method is designed for the mapping points falling in the advanced semantic constraint region according to the point density of the interval where the mapping points are located, virtual mapping points are generated by sampling and are reversely mapped to the original point cloud space, so as to effectively fill the sparse or missing region of the original networked vehicle point cloud cluster.

The object of the present application is achieved through the following technical solution: in a first aspect, the present application provides a method for estimating a position of a networked vehicle based on independent non-uniform increment sampling, including the following steps:

Step 1: acquiring a point cloud and an image data frame which are spatiotemporal aligned in real-time through a solid-state laser radar and a camera, segmenting all target instances in the image data frame, and defining an image region where a target instance whose advanced semantic category is a networked vehicle is located as an advanced semantic constraint region.

Step 2: using an affine transformation matrix from the point cloud to the image data frame to map all point clouds in a point cloud frame to a corresponding image, retaining mapping points falling in the advanced semantic constraint region, and discarding mapping points falling in other regions.

Step 3: for a networked vehicle target instance in the advanced semantic constraint region, collecting all mapping points falling within its instance region, dividing a plurality of depth intervals at equal intervals according to the depth values of the mapping points, and designing an independent non-uniform increment sampling method to perform independent increment sampling on each depth interval to generate virtual mapping points, wherein specifically, a sampling rate is set according to a point density of each depth interval, and a relatively higher sampling rate is set for a depth interval with a low point density, and a highest sampling number for each interval is limited, so that sparse and missing regions of the mapping points are partially filled, and meanwhile invalid sampling is avoided.

Step 4, reversely mapping the virtual mapping points to the original point cloud space to merge the virtual mapping points with the original point cloud, and then detecting networked vehicle targets and its' center point coordinate by using the merged point cloud to generate position estimation information of the networked vehicle.

In a second aspect, the present application provides a device for estimating a position of a networked vehicle based on independent non-uniform increment sampling, comprising a memory and one or more processors, wherein executable codes are stored in the memory, and when executing the executable codes, the processor is used to implement the steps of the method for estimating a position of a networked vehicle based on independent non-uniform increment sampling.

In a third aspect, the present application provides a computer-readable storage medium on which a program is stored, wherein when executed by a processor, the program implements the steps of the method for estimating a position of a networked vehicle based on independent non-uniform increment sampling.

The present application has the beneficial effects that the existing solid-state laser radar sensing algorithm cannot accurately sense the complete outline of the networked vehicle due to sparse or missing point cloud clusters of the networked vehicle, resulting in inaccurate position estimation of the networked vehicle. By using the advanced semantic features of the image data frame aligned with the point cloud data frame to constrain the mapping points, the mapping points in the constrained region are divided into a plurality of depth intervals at equal intervals according to the depth values of the mapping points, and each depth interval is incrementally sampled according to the point density by using an independent non-uniform increment sampling method to generate virtual mapping points, and the virtual mapping points are reversely mapped to the origin cloud data space to fill the sparse or missing regions of the target point cloud cluster of the networked vehicle. Based on the filled point cloud, the deep learning method is adopted to realize the accurate estimation of the position of the networked vehicle, thereby improving the accuracy of the position estimation of the point cloud target of the networked vehicle, and providing reliable technical support for the accurate monitoring of the intelligent networked vehicle.

DESCRIPTION OF EMBODIMENTS

The object and effect of the present application will become more clear when the present application is described in detail according to the attached drawings. It should be understood that the specific embodiments described here are only used to explain the present application, and are not used to limit the present application.

Figure 1:
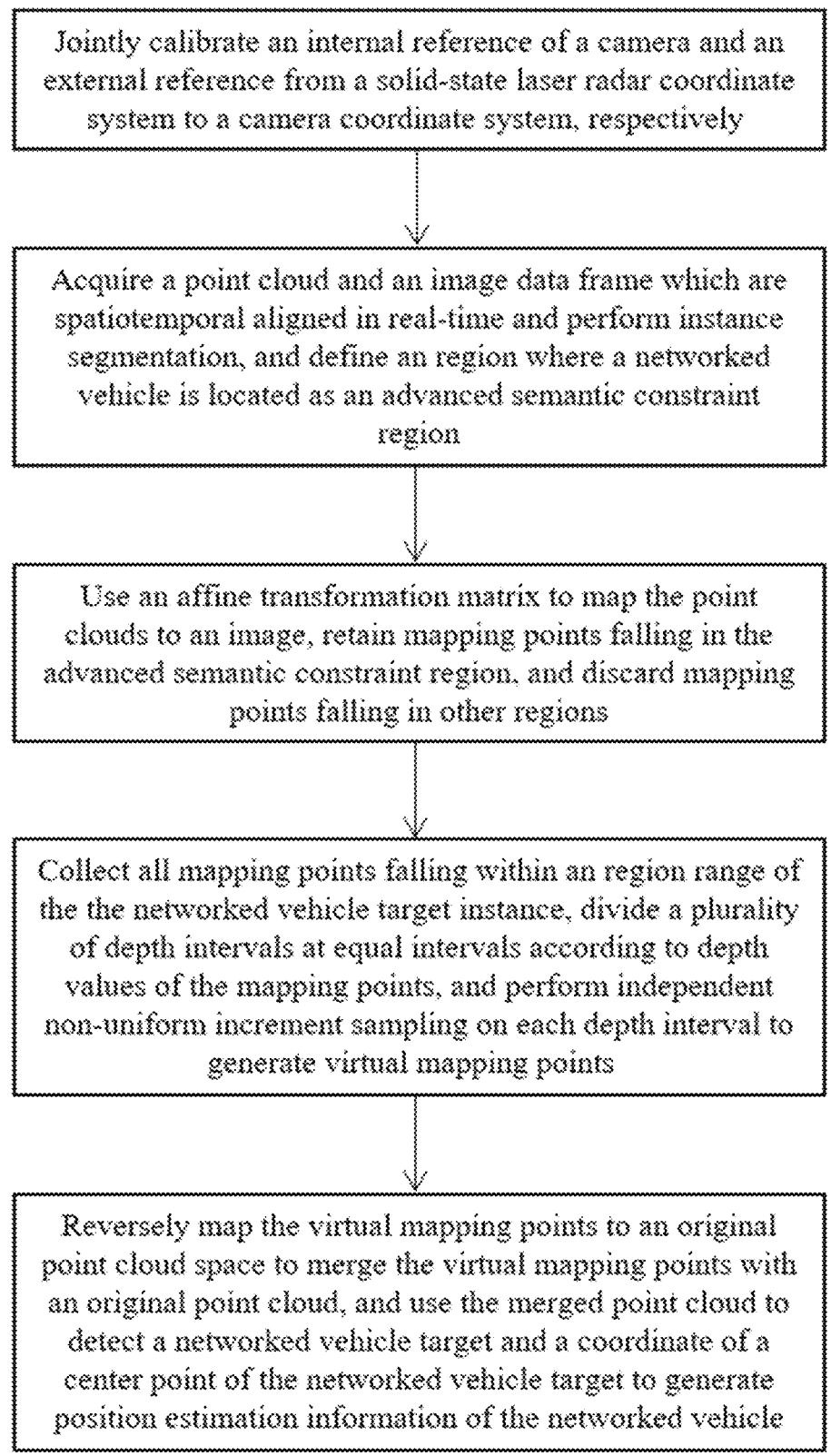
FIG. 1 is a flowchart of a method for estimating a position of a networked vehicle based on independent non-uniform increment sampling provided by the present application.

As shown in FIG. 1, the present application provides a method for estimating the position of a networked vehicle based on independent non-uniform increment sampling, which is used to solve the problems that the solid-state laser radar has a short sensing distance, the targets within the sensing range are mutually shielded, the point cloud clusters formed by the scanning of networked vehicles that are far away from the scanning point or partially shielded are sparse or missing, and the perception algorithm relying on low-cost solid-state laser radar cannot accurately perceive the complete contour of networked vehicles, resulting in inaccurate position estimation of networked vehicles and low reliability of intelligent monitoring of networked vehicles.

According to the present application, by introducing image features of time synchronization, the mapping point data to be processed is reduced by advanced semantic constraints, virtual mapping points are generated by increment sampling of the mapping points, and the mapping points are reversely mapped to the original point cloud data space, so that sparse or missing regions of the target point cloud clusters of the networked vehicles in the original point cloud are effectively filled, a relatively complete point cloud outline is formed, and the sensing accuracy of the sensing algorithm to the networked vehicles is improved. The method of that application includes the following step:

Step (1): A solid-state laser radar and a camera are installed on a roadside pole in the park, the time synchronization of data frames of the solid-state laser radar and the camera are controlled by hardware wire control, and the internal reference of the camera and the external reference from the solid-state laser radar coordinate system to the camera coordinate system are jointly calibrated respectively.

The camera internal reference calibration method usually adopts a checkerboard, and the internal reference parameters are generated by collecting checkerboard data of multiple angles and distances and calling a calibration function. The external reference joint calibration of the solid-state laser radar coordinate system to the camera coordinate system includes the following steps: placing a plurality of white boards with different sizes and distances, recording plurality of images and point cloud data synchronized in time by using ROS, and marking a plurality of groups of corner points of the white boards for each frame of time-synchronized images and point cloud data, wherein the corner points in the point cloud data are three-dimensional coordinates and the corner points in the image are two-dimensional coordinates; calling a calibration function to generate external reference for any group of corner points, and iteratively correcting the external reference through the plurality of groups of corner points until the external reference parameters are stable in a small precision range; using the calibrated internal and external reference parameters, mapping the original point cloud from the original point cloud space to the image, and at the same time, reversely mapping the generated virtual mapping point from the virtual mapping point to the original point cloud space by using the pixel coordinates and depth values thereof.

Figure 2:
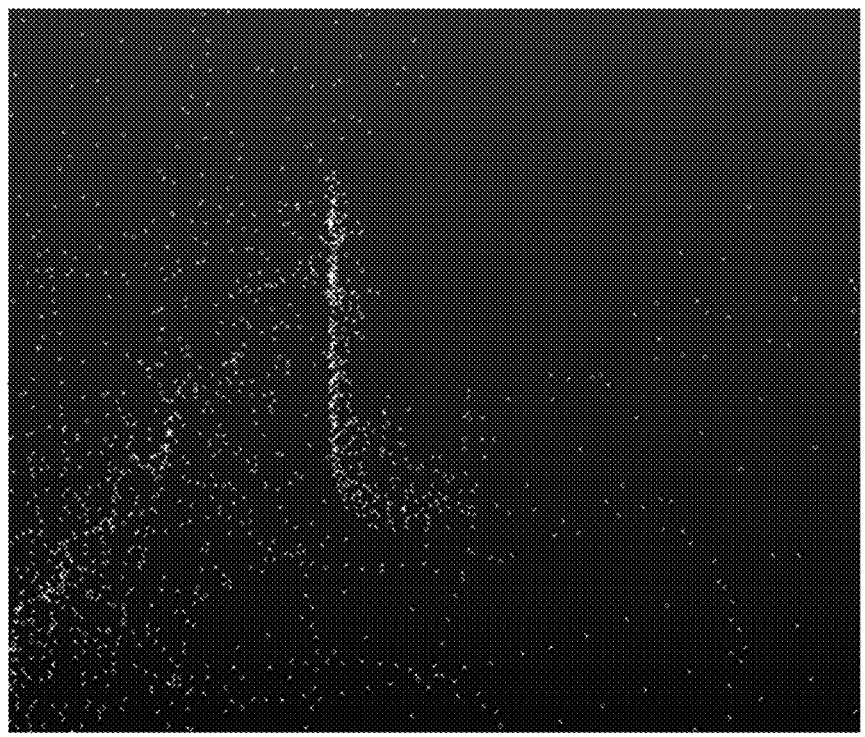
FIG. 2 is a cluster of a networked vehicle target point cloud in the original point cloud data of a solid-state laser radar.
Figure 3:
FIG. 3 is a cluster of a remote networked vehicle target point cloud in the original point cloud data of a solid-state laser radar.

In the point cloud data frame collected by the solid-state laser radar, as shown in FIG. 2, the point cloud cluster of the networked vehicle in the point cloud data frame is blocked, some point clouds are missing, and the outline of the target point cloud of the networked vehicle is incomplete. As shown in FIG. 3, the point cloud clusters of the networked vehicle in the point cloud data frame are sparse and the outline of networked vehicles is incomplete because of the long distance. The perception accuracy of such remote networked vehicle target point cloud clusters using three-dimensional target perception algorithm is low.

Step (2): The point cloud and image data frame aligned in time and space are obtained in real time, an instance segmentation algorithm based on Mask-Region Convolutional Neural Network (Mask-RCNN) is used for any image data frame to segment all the target instances in the image data, and the image region where the target instance, whose advanced semantic category is a networked vehicle, is located as an advanced semantic constraint region.

The example segmentation algorithm based on Mask-RCNN is a deep learning neural network algorithm, which can segment all target examples in the image, including pedestrians, non-motor vehicles, networked vehicles, etc. In order to pertinently process the mapping points with an advanced semantic category of networked vehicles, avoid unnecessary filling of invalid point clouds (such as background filling), advanced semantic constraint regions are defined to semantically constrain the mapping points, and only the mapping points with advanced semantic category of networked vehicles are processed, so that the total processing delay and the number of virtual point clouds generated by sampling are reduced, and the implementation efficiency of the method is improved.

Step (3): An affine transformation matrix from the point cloud to the image is generated according to the calibrated internal reference and external reference, and the affine transformation matrix is used to map all the point clouds in the corresponding point cloud frame to the image, the mapping points falling in the advanced semantic constraint region are retained, and the mapping points falling in other regions are discarded.

Figure 4:
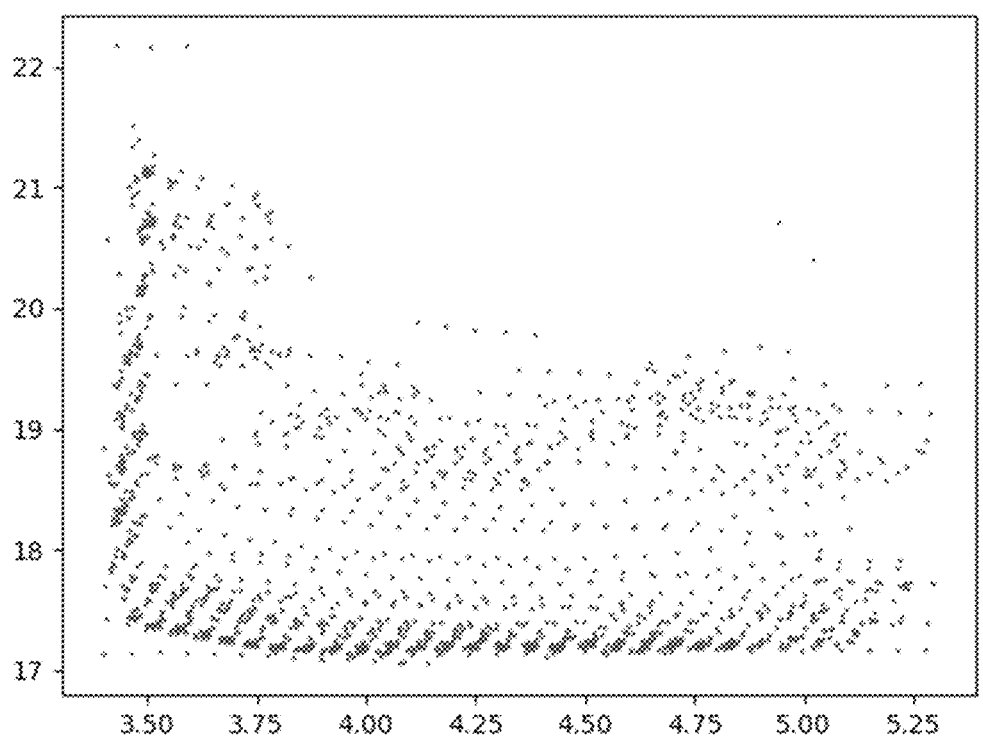
FIG. 4 is a distribution diagram of mapping points of an original point cloud mapped to the high-level semantic constraint region of the same target instance.

The distribution of the mapping points of the networked vehicle point cloud target in the point cloud frame mapped to the mapping point of the advanced semantic constraint region in the image is as shown in FIG. 4, which shows the mapping point distribution on a single networked vehicle target instance, with the abscissa indicating the pixel coordinate u value of the mapping point and the vertical ordinate indicating the depth value of the mapping point. As can be seen from FIG. 4, the mapping point density varies with the depth value, and the target contour in the region with high point density is relatively complete, so there is no need for excessive sampling; the local contour in the region with a low point density is incomplete, so it is necessary to sample at a higher sampling rate.

Further, the step (3) includes the following sub-steps:

Sub-step (3.1): The affine transformation matrix from the point cloud to the image data frame is generated according to the calibrated internal reference and external reference, which is specifically as follows:

Assuming that a calibrated internal reference matrix is InM and a calibrated external reference matrix is OutM, the affine transformation matrix H from the point cloud to the image data frame satisfies:

$$H = InM * OutM$$

where a dimension size of the internal reference matrix InM is 3*3, a dimension size of the external reference matrix OutM is 3*4, and a dimension size of the affine transformation matrix H is 3*4.

The internal reference is the camera internal reference, and the external reference is a conversion matrix from the solid-state laser radar coordinate system to the camera coordinate system.

Sub-step (3.2): All the point clouds in the point cloud frame are mapped to the corresponding image data frames by using the affine transformation matrix, retaining the mapping points whose coordinates are within the advanced semantic constraint region, and discarding the mapping points mapped in other regions, which is specifically as follows:

Assuming that a set of image pixel coordinate points contained in the advanced semantic constraint region is PixelCol, and assuming that a coordinate of a point cloud in the point cloud frame is (x,y,z), a pixel coordinate (u,v) and a depth value d of a mapping point of the point cloud in the image data frame satisfy:

$$\begin{bmatrix} u\_d \\ v\_d \\ d \end{bmatrix} = H * \begin{bmatrix} x \\ y \\ z \\ 1 \end{bmatrix}$$

$$\begin{bmatrix} u \\ v \end{bmatrix} = \text{ceil} \begin{bmatrix} \frac{u\_d}{d} \\ \frac{v\_d}{d} \end{bmatrix}$$

where ceil represents rounding up, u_d and v_d represent the floating-point coordinate values mapped from the point cloud to the image, respectively, and u and v are integer coordinate values obtained by dividing u_d and v_d by the depth value d and rounding up, respectively; wherein if (u,v)∈PixelCol, the mapping point is in the advanced semantic constraint region, and a retaining operation is performed; otherwise, the mapping point is not in the advanced semantic constraint region, and a discarding operation is performed; all point clouds are traversed to perform mapping operation until all point clouds are traversed.

Step (4): For a networked vehicle target instance in the advanced semantic constraint region, all mapping points falling within it's instance region range thereof are collected, a plurality of depth intervals at equal intervals are divided according to the depth values of the mapping points, and an independent non-uniform increment sampling method is designed to perform independent increment sampling on each depth interval to generate virtual mapping points; specifically, a sampling rate is set according to a point density of each depth interval, and a relatively higher sampling rate is set for the depth interval with a low point density, and a highest sampling number for each interval is limited, so that sparse and missing regions of the mapping points are partially filled, and meanwhile invalid sampling is avoided; the following sub-steps are included:

Sub-step (4.1): For a networked vehicle target instance, all the mapping points that fall within the instance region thereof are collected, and several depth intervals at equal intervals are divided according to the depth values of the mapping points, which is specifically as follows:

Assuming that a total number of all mapping points in the instance region is N, a maximum depth value of the mapping points is d_max, and a minimum depth value of the mapping points is d_min, then the number of the depth intervals N satisfies:

$$Num_d = \text{ceil}\left(\frac{d\_max - d\_min}{d\_interval}\right)$$

where ceil represents rounding up, and d_interval represents a depth range of the depth intervals, which is an empirical constant; in this example, according to the sparse distribution of point clouds of the laser radar, the depth value is set to 0.8.

The setting of the depth value is determined according to the size of networked vehicle target of the original point cloud and the distribution of the point cloud. When the depth value is set to 0.8, the number of mapping points in a depth interval is about 120 when the mapping points are full and evenly distributed, and the coordinates of the sampled virtual mapping points can still be retained in the depth interval, and the reversely mapped points can be reasonably distributed in the point cloud hosting, therefore it is not easy to generate sampling noise points.

The mapping points with depth values in an interval of $[d_{min}+(i-1)*d_{interval}, d_{min}+i*d_{interval}]$, are divided into an $i^{th}$ depth interval, $1 \leq i \leq Num_d$, and a division operation is performed on each mapping point until all mapping points are divided.

Sub-step (4.2): The point density of each depth interval is calculated, which is specifically as follows:

The point density is calculated according to the number of mapping points in each depth interval, and the point density $density_i$ of the $i^{th}$ depth interval satisfies:

$$density_i = \frac{total\_n_i}{\max(total\_n_1, total\_n_2, \ldots, total\_n_{Num_d})}$$

where $total\_n_i$ represents the number of mapping points in the $i^{th}$ depth interval.

Sub-step (4.3): The sampling rate and sampling number of each depth interval are calculated, which is specifically as follows:

The sampling rate and sampling number of each depth interval are calculated according to the point density of each depth interval, and then the sampling rate $sample\_rate_i$ and the sampling number $sample\_num_i$ of the $i^{th}$ depth interval satisfy:

$$sample\_rate_i = \frac{A - density_i * B}{total\_n_i}$$

$$sample\_num_i = \min(max\_sample\_points, sample\_rate_i * total\_n_i)$$

where $sample\_rate_i$ represents the sampling rate of the $i^{th}$ depth interval, $sample\_num_i$ represents the sampling number of the $i^{th}$ interval, A represents the number of mapping points in a state where mapping points in a depth interval are full and evenly distributed, B represents a lowest number of mapping points that can be accurately perceived in a depth interval, max_sample_points represents a highest sampling number, and A, B and max_sample_points represent empirical values. In the embodiment of the present application, according to the distribution feature of the cloud data of the laser radar point, the A value is set to 120, the B value is set to 85, and max_sample_points is set to 95.

Sub-step (4.4): Independent increment sampling is performed according to the sampling number of each depth interval to generate the virtual mapping points, which is specifically as follows:

Sub-sampling $sample\_num_i$ is randomly repeated for a depth interval i, and the mapping points sampled each time are subjected to a standard normal offset to generate the virtual mapping points; assuming that a pixel coordinate of the mapping point for a certain sampling before offset is (m,n), a pixel coordinate (m',n') after the standard normal offset is expressed as follows:

$$m' = m + \alpha * \frac{1}{\sqrt{2\pi}} e^{-\frac{x^2}{2}}$$

$$n' = n + \alpha * \frac{1}{\sqrt{2\pi}} e^{-\frac{x^2}{2}}$$

where x represents a random number with a value range of [−1,1], and α represents an offset coefficient, which is an empirical constant; then the pixel coordinate of the virtual mapping point generated by each sampling is (m',n'), and the depth value is an average depth value of all mapping points in the depth interval i.

In the embodiment of the present application, the a value is 10, and the virtual mapping point formed by offset fluctuates within the range of about a pixel distance of [−4,4] near the original mapping point, and the offset distribution conforms to the standard normal distribution of the middle segment.

Step (5): The virtual mapping points are reversely mapped to the original point cloud space to be merged with the original point cloud, and the merged point cloud is used to detect networked vehicle targets and its' center point coordinates thereof to generate position estimation information of the networked vehicle. Specifically, the following sub-steps are included.

Sub-step (5.1): The virtual mapping points are reversely mapped to the origin cloud space to be merged with the original point cloud, which is specifically as follows:

For a generated virtual mapping point p, assuming that the pixel coordinate thereof is $(m_p, n_p)$ and the depth value thereof is $d_p$, then the point cloud coordinates $(x_p, y_p, z_p)$ thereof inversely mapped to the point cloud space are expressed as follows:

$$\begin{bmatrix} x_p \\ y_p \\ z_p \\ 1 \end{bmatrix} = \begin{bmatrix} H \\ I \end{bmatrix}^{-1} * \begin{bmatrix} m_p \\ n_p \\ d_p \\ 1 \end{bmatrix}$$

where H represents the affine transformation matrix from the point cloud to the image, and I represents a one-dimensional vector [0,0,0,1]; wherein reverse mapping operation is performed on all generated virtual mapping points until all virtual mapping points are reversely mapped, and a point cloud generated by reverse mapping is merged with the original point cloud.

Sub-step (5.2): The coordinates of the center point of the networked vehicle target are detected with a three-dimensional object detection algorithm by using the merged point cloud, and the position estimation information of the networked vehicle is generated, which is specifically as follows:

Assuming that the coordinate of the center point of the networked vehicle target is (xc,yc,zc) then the position estimation information of the generated networked vehicle satisfies: the generated networked vehicle is $\sqrt{(xc)^2+(yc)^2+(zc)^2}$ meters from an installation origin of the solid-state laser radar, and an included angle between the generated networked vehicle and an abscissa of the coordinate system of the solid-state laser radar is $$\tan^{-1}\frac{yc}{xc}.$$

Figure 5:
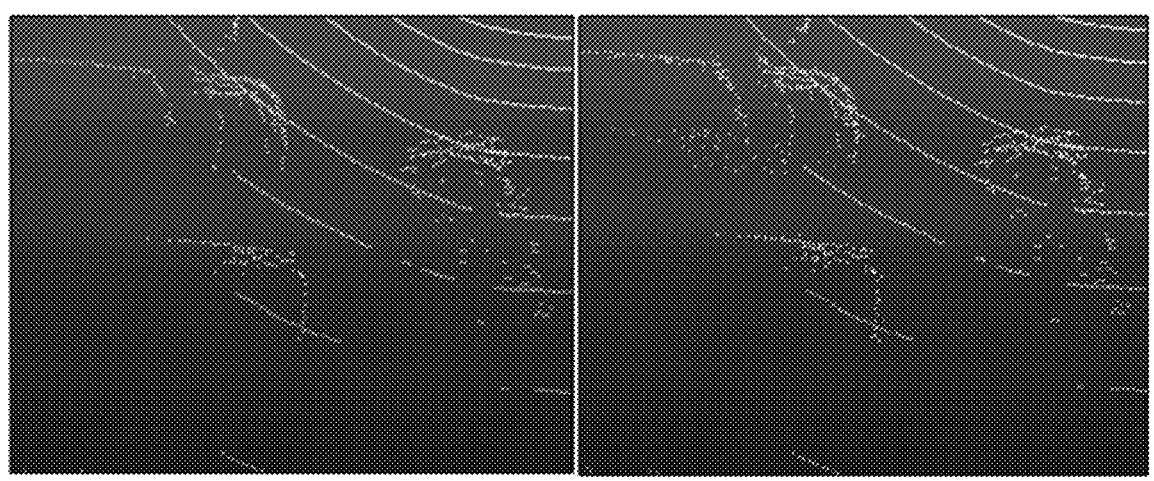
FIG. 5 is a comparison diagram of the point cloud distribution between the merged point cloud cluster and the original point cloud cluster.

The merging refers to a new point cloud data space composed of the point cloud generated by reverse mapping and the original point cloud. The new point cloud data space effectively fills the sparse or missing region of the point cloud cluster of the networked vehicle target, and improves the accuracy of the three-dimensional target perception algorithm for the networked target perception. The left figure in FIG. 5 shows the point cloud distribution of the point cloud clusters of the original point cloud networked vehicle before filling, and the right figure in FIG. 5 shows the point cloud distribution in the new point cloud data space of the point cloud clusters of the networked vehicle after the virtual mapping points reversely mapped and filled by the increment sampling method. It can be clearly observed that the point cloud clusters of the networked vehicle on the right figure becomes dense, the number of points is 2.5 times of the original, and the outline of the networked vehicle is clearer.

Figure 6:
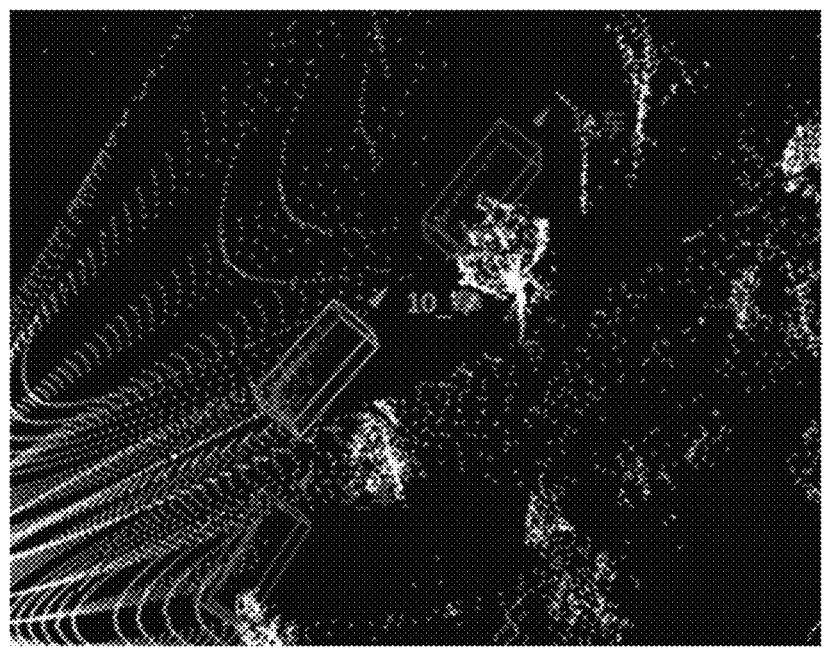
FIG. 6 shows the target position and contour detected for the merged point cloud using a three-dimensional target detection algorithm named CenterPoint.

The three-dimensional object detection algorithm is the CenterPoint neural network model, and the center point coordinates of the target point cloud cluster are regressed by feature extraction of point cloud data. This method has advantages in small target object detection and target contour missing perception, and is an algorithm network commonly used for point cloud data feature extraction and object detection. Three-dimensional object detection is carried out on the merged point cloud, and the three-dimensional object detection results of the networked vehicle of a point cloud data frame is shown in FIG. 6, which can accurately detect the complete outline and position of the networked vehicle targets.

According to the experimental measurement, by adopting the method of the present application, the accuracy of the target position estimation of the networked vehicle is improved by 6 percentage points, and the position deviation is less than 5 cm, so that the accurate position estimation of the networked vehicle can be realized.

Corresponding to the aforementioned embodiment of the method for estimating a position of a networked vehicle based on independent non-uniform increment sampling, the present application also provides an embodiment of the device for estimating a position of a networked vehicle based on independent non-uniform increment sampling.

Figure 7:
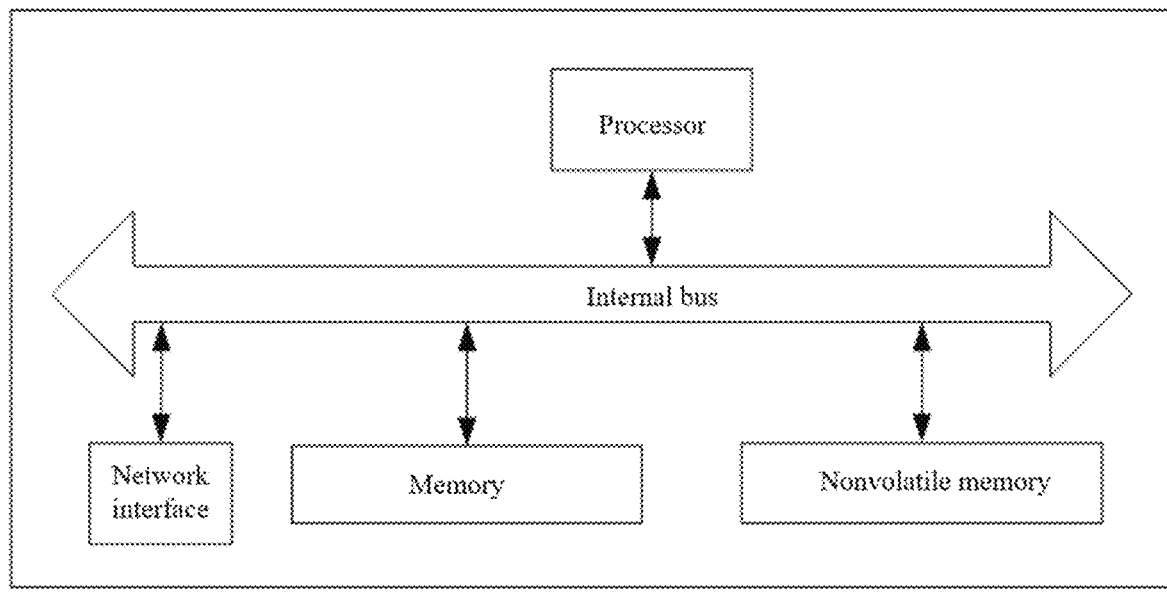
FIG. 7 is a structural diagram of a device for estimating a position of a networked vehicle based on independent non-uniform increment sampling provided by the present application.

Referring to FIG. 7, a device for estimating a position of a networked vehicle based on independent non-uniform increment sampling provided by an embodiment of the present application includes a memory and one or more processors; the memory stores executable codes, and when the processor executes the executable codes, the processor implements the method for estimating a position of a networked vehicle based on independent non-uniform increment sampling.

The embodiment of the device for estimating a position of a networked vehicle based on independent non-uniform increment sampling of the present application can be applied to any equipment with data processing capability, which can be devices or apparatuses such as computers. The embodiment of the device can be realized by software, or by hardware or a combination of hardware and software. Taking software implementation as an example, as a logical device, it is formed by reading the corresponding computer program instructions in the non-volatile memory into the memory through the processor of any equipment with data processing capability. From the hardware level, as shown in FIG. 7, it is a hardware structure diagram of any equipment with data processing capability where the networked vehicle position estimation device based on independent non-uniform increment sampling of the present application is located. In addition to the processor, memory, network interface and nonvolatile memory shown in FIG. 7, any equipment with data processing capability where the device is located in the embodiment can usually include other hardware according to the actual functions of the equipment with data processing capability, which will not be described here again.

The implementation process of the functions and functions of each unit in the above-mentioned device is detailed in the implementation process of the corresponding steps in the above-mentioned method, and will not be repeated here.

For the device embodiment, because it basically corresponds to the method embodiment, it is only necessary to refer to the partial description of the method embodiment for the relevant points. The device embodiments described above are only schematic, in which the units described as separate components may or may not be physically separated, and the components displayed as units may or may not be physical units, that is, they may be located in one place or distributed to multiple network units. Some or all of the modules can be selected according to actual needs to achieve the purpose of the solution of the present application. Those having ordinary skill in the art can understand and implement it without creative labor.

The embodiment of the present application also provides a computer-readable storage medium, on which a program is stored, which, when executed by a processor, implements the method for estimating a position of a networked vehicle based on independent non-uniform increment sampling in the above embodiment.

The computer-readable storage medium can be an internal storage unit of any device with data processing capability as described in any of the previous embodiments, such as a hard disk or a memory. The computer-readable storage medium can also be an external storage device of any device with data processing capability, such as a plug-in hard disk, Smart Media Card (SMC), SD card, Flash Card, and the like provided on the device. Further, the computer-readable storage medium can also include both internal storage units and external storage devices of any device with data processing capability. The computer-readable storage medium is used for storing the computer program and other programs and data required by any equipment with data processing capability, and can also be used for temporarily storing data that has been output or will be output.

The above-mentioned embodiments are used to explain the present application, but not to limit the present application. Any modification and change made to the present application within the scope of protection of the spirit and claims of the present application shall fall within the scope of protection of the present application.

What is claimed is:

1. A method for estimating a position of a networked vehicle based on independent non-uniform increment sampling, comprising:
    step (1): acquiring a point cloud and an image data frame which are spatiotemporal aligned in real-time through a solid-state laser radar and a camera, segmenting all target instances in the image data frame, and defining an image region where a target instance whose advanced semantic category is a networked vehicle is located as an advanced semantic constraint region;
    step (2): using an affine transformation matrix from the point cloud to the image data frame to map all point clouds in a point cloud frame to a corresponding image, retaining mapping points falling in the advanced semantic constraint region, and discarding mapping points falling in other regions;
    step (3): for a networked vehicle target instance in the advanced semantic constraint region, collecting all mapping points falling within its instance region, dividing a plurality of depth intervals at equal intervals according to the depth values of the mapping points, and designing an independent non-uniform increment sampling method to perform independent increment sampling on each depth interval to generate virtual mapping points, wherein a sampling rate is set according to a point density of each depth interval, a higher sampling rate is set for a depth interval with a low point density, and a highest sampling number for each interval is limited, in such a manner that sparse and missing regions of the mapping points are partially filled, and invalid sampling is avoided; and step (4): reversely mapping the virtual mapping points to an original point cloud space to merge the virtual mapping points with an original point cloud, and then detecting networked vehicle targets and its' center point coordinate by using the merged point cloud to generate position estimation information of the networked vehicle.

2. The method for estimating a position of a networked vehicle based on independent non-uniform increment sampling according to claim 1, wherein in the step 1, data frame time synchronization of the solid-state laser radar and the camera is controlled by hardware wire control, and an internal reference of the camera and an external reference from a coordinate system of the solid-state laser radar to a coordinate system of the camera are jointly calibrated.

3. The method for estimating a position of a networked vehicle based on independent non-uniform increment sampling according to claim 1, wherein in the step 1, an instance segmentation algorithm based on Mask Region-based Convolutional Neural Network (Mask-RCNN) is adopted for any image data frame to segment all target instances in the image data frame.

4. The method for estimating a position of a networked vehicle based on independent non-uniform increment sampling according to claim 2, wherein the step 2 comprises sub-steps of:

sub-step (2.1): generating the affine transformation matrix from the point cloud to the image data frame according to the calibrated internal reference and external reference, the sub-step (2.1) comprises:

assuming that a calibrated internal reference matrix is InM and a calibrated external reference matrix is OutM, the affine transformation matrix H from the point cloud to the image data frame satisfies:

$$H=InM*OutM$$

where a dimension size of the internal reference matrix InM is 3*3, a dimension size of the external reference matrix OutM is 3*4, and a dimension size of the affine transformation matrix H is 3*4; and sub-step (2.2): mapping all the point clouds in the point cloud frame to corresponding image data frames by using the affine transformation matrix, retaining the mapping points whose coordinates are within the advanced semantic constraint region, and discarding the mapping points mapped in other regions, the sub-step (2.2) comprises:

assuming that a set of image pixel coordinate points contained in the advanced semantic constraint region is PixelCol, and assuming that a coordinate of a point cloud in the point cloud frame is (x,y,z), a pixel coordinate (u,v) and a depth value d of a mapping point of the point cloud in the image data frame satisfy:

$$\begin{bmatrix} u\_d \\ v\_d \\ d \end{bmatrix} = H * \begin{bmatrix} x \\ y \\ z \\ 1 \end{bmatrix}$$

$$\begin{bmatrix} u \\ v \end{bmatrix} = ceil \begin{bmatrix} \frac{u\_d}{d} \\ \frac{v\_d}{d} \end{bmatrix}$$

where ceil represents rounding up, u_d and v_d represent the floating-point coordinate values mapped from the point cloud to the image, respectively, and u and v are integer coordinate values obtained by dividing u_d and v_d by the depth value d and rounding up, respectively; wherein if (u,v)∈PixelCol, the mapping point is in the advanced semantic constraint region, and a retaining operation is performed; otherwise, the mapping point is not in the advanced semantic constraint region, and a discarding operation is performed; all point clouds are traversed to perform mapping operation until all point clouds are traversed.

5. The method for estimating a position of a networked vehicle based on independent non-uniform increment sampling according to claim 1, wherein the step 3 comprises sub-steps of:

sub-step (3.1): for a networked vehicle target instance, collecting all mapping points that fall within the instance region, and dividing several depth intervals at equal intervals according to depth values of the mapping points, the sub-step (3.1) comprises:

assuming that a total number of all mapping points in the instance region is N, a maximum depth value of the mapping points is d_max, and a minimum depth value of the mapping points is d min, a number of the depth intervals $Num_d$ satisfies:

$$Num_d = ceil\left(\frac{d\_max - d\_min}{d\_interval}\right)$$

where ceil represents rounding up, and d_interval represents a depth range of the depth intervals, which is an empirical constant;

wherein the mapping points with depth values in an interval of $[d_{min}+(i-1)*d_{interval}, d_{min}+i*d_{interval}]$ are divided into an in depth interval, $1 \leq i \leq Num_d$, and a division operation is performed on each mapping point until all mapping points are divided;

sub-step (3.2): calculating the point density of each depth interval, the sub-step (3.2) comprises:

the point density is calculated according to a number of mapping points in each depth interval, and the point density $density_i$ of the $i^{th}$ depth interval satisfies:

$$density_i = \frac{total\_n_i}{max\left(total\_n_1, total\_n_2, \ldots, total\_n_{Num_d}\right)}$$

where $total\_n_i$ represents the number of mapping points in the $i^{th}$ depth interval;

sub-step (3.3): calculating the sampling rate and sampling number of each depth interval, the sub-step (3.3) comprises:

the sampling rate and sampling number of each depth interval are calculated according to the point density of each depth interval, and the sampling rate sample_rate$_i$ and the sampling number sample_num$_i$ of the i$^{th}$ depth interval satisfy:

$$\text{sample\_rate}_i = \frac{A - \text{density}_i * B}{\text{total\_n}_i}$$

$$\text{sample\_num}_i = \min(\text{max\_sample\_points}, \text{sample\_rate}_i * \text{total\_n}_i)$$

where sample_rate$_i$ represents the sampling rate of the i$^{th}$ depth interval, sample_num$_i$ represents the sampling number of the i$^{th}$ interval, A represents the number of mapping points in a state where mapping points in a depth interval are full and evenly distributed, B represents a lowest number of mapping points that can be accurately perceived in a depth interval, max_sample_points represents a highest sampling number, and A, B and max_sample_points represent empirical values; and sub-step (3.4): carrying out independent increment sampling according to the sampling number of each depth interval to generate the virtual mapping points, the sub-step (3.4) comprises:

sub-sampling sample_num$_i$ is randomly repeated for a depth interval i, and the mapping points sampled each time are subjected to a standard normal offset to generate the virtual mapping points; assuming that a pixel coordinate of the mapping point for a certain sampling before offset is (m,n), a pixel coordinate (m',n') after the standard normal offset satisfies:

$$m' = m + \alpha * \frac{1}{\sqrt{2\pi}} e^{-\frac{x^2}{2}}$$

$$n' = n + \alpha * \frac{1}{\sqrt{2\pi}} e^{-\frac{x^2}{2}}$$

where x represents a random number with a value range of [−1,1], and α represents an offset coefficient, which is an empirical constant; the pixel coordinate of the virtual mapping point generated by each sampling is (m',n'), and the depth value is an average depth value of all mapping points in the depth interval i.

6. The method for estimating a position of a networked vehicle based on independent non-uniform increment sampling according to claim 1, wherein the step (4) comprises sub-steps of:

sub-step (4.1): reversely mapping the virtual mapping points to the origin cloud space to be merged with the original point cloud, the sub-step (4.1) comprises:

for a generated virtual mapping point p, assuming that a pixel coordinate of the generated virtual mapping point is (m$_p$,n$_p$) and a depth value of the generated virtual mapping point is d$_p$, a point cloud coordinate (x$_p$,y$_p$,z$_p$) of the generated virtual mapping point inversely mapped to the point cloud space satisfies:

$$\begin{bmatrix} x_p \\ y_p \\ z_p \\ 1 \end{bmatrix} = \begin{bmatrix} H \\ I \end{bmatrix}^{-1} * \begin{bmatrix} m_p \\ n_p \\ d_p \\ 1 \end{bmatrix}$$

where H represents the affine transformation matrix from the point cloud to the image, and I represents a one-dimensional vector [0,0,0,1]; wherein reverse mapping operation is performed on all generated virtual mapping points until all virtual mapping points are reversely mapped, and a point cloud generated by reverse mapping is merged with the original point cloud; and sub-step (4.2): detecting the coordinate of the center point of the networked vehicle target with a three-dimensional target detection algorithm by using the merged point cloud, and generating the position estimation information of the networked vehicle, the sub-step (4.2) comprises:

assuming that the coordinate of the center point of the networked vehicle target is (xc,yc,zc), the position estimation information of the generated networked vehicle satisfies: the generated networked vehicle is $\sqrt{(xc)^2+(yc)^2+(zc)^2}$ meters from an installation origin of the solid-state laser radar, and an included angle between the generated networked vehicle and an abscissa of the coordinate system of the solid-state laser radar is $$\tan^{-1}\frac{yc}{xc}.$$

7. A device for estimating a position of a networked vehicle based on independent non-uniform increment sampling, comprising a memory and one or more processors, wherein executable codes are stored in the memory, and when executing the executable codes, the processor is used to implement steps of the method for estimating a position of a networked vehicle based on independent non-uniform increment sampling according to claim 1.

8. A non-transitory computer-readable storage medium on which a program is stored, wherein when executed by a processor, the program implements steps of the method for estimating a position of a networked vehicle based on independent non-uniform increment sampling according to claim 1.

* * * * *